June 8, 1926.

A. S. HOWELL 1,587,955

MOTION PICTURE PROJECTING MACHINE AND THE LIKE

Filed July 1, 1922    7 Sheets-Sheet 1

Inventor.
Albert S. Howell
By Miehle + Miehle, Attys.

June 8, 1926.

A. S. HOWELL 1,587,955

MOTION PICTURE PROJECTING MACHINE AND THE LIKE

Filed July 1, 1922     7 Sheets-Sheet 3

Inventor:
Albert S. Howell

By Miehle + Miehle, Att'y.

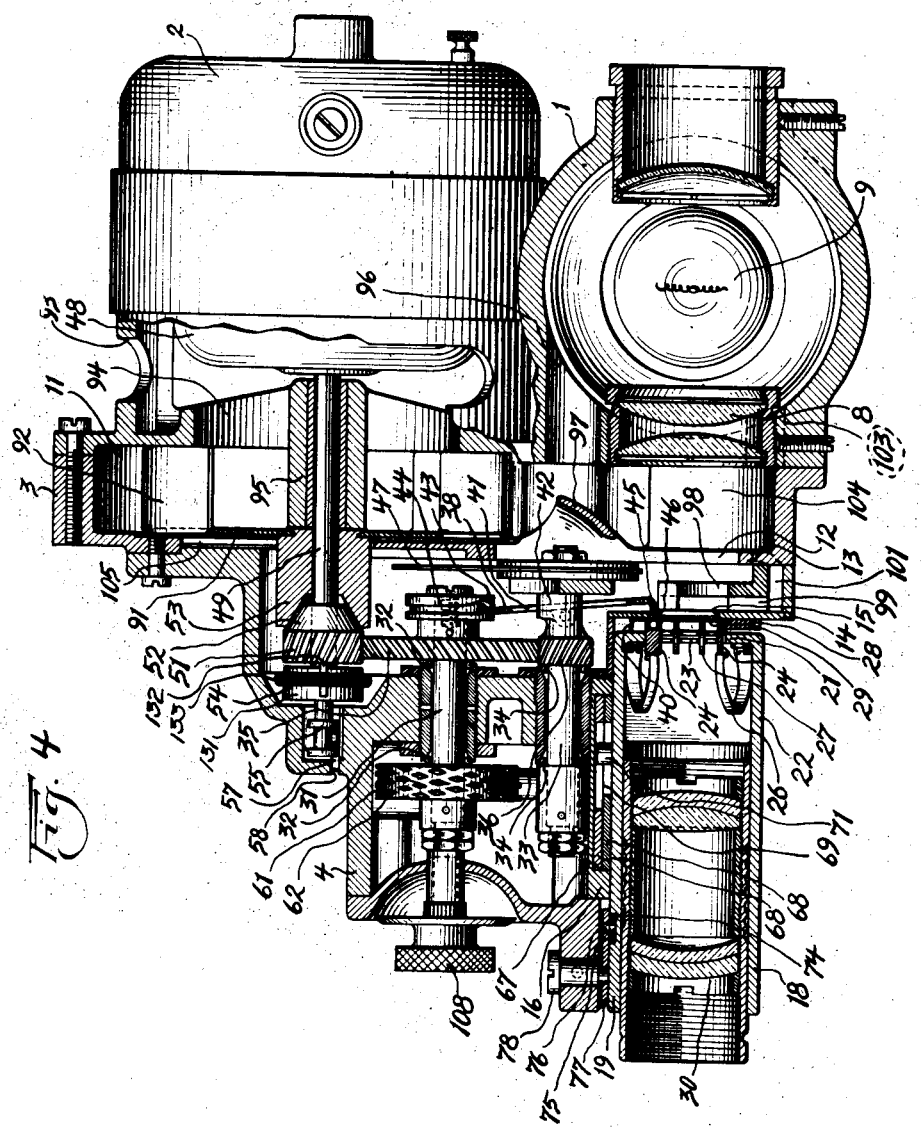

June 8, 1926.
A. S. HOWELL
1,587,955
MOTION PICTURE PROJECTING MACHINE AND THE LIKE
Filed July 1, 1922      7 Sheets-Sheet 5
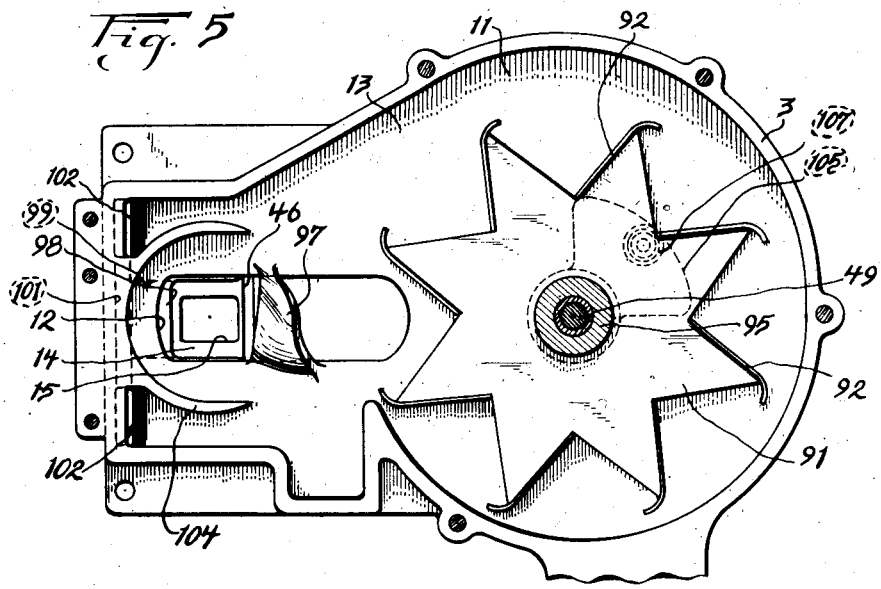
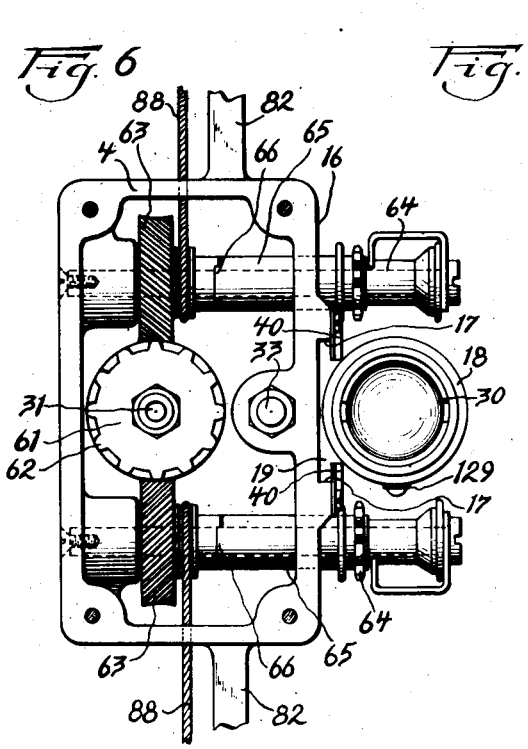
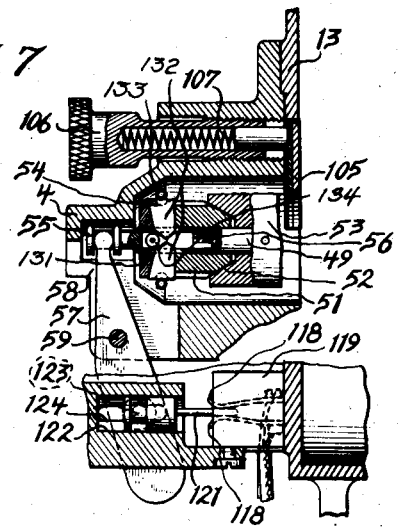
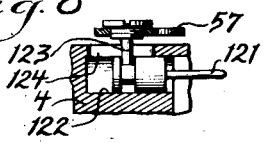
Inventor:
Albert S. Howell
By Miehle + Miehle, Attys.

June 8, 1926.

A. S. HOWELL 1,587,955

MOTION PICTURE PROJECTING MACHINE AND THE LIKE

Filed July 1, 1922 7 Sheets-Sheet 6

Inventor:
Albert S. Howell

By Miehle & Miehle Attys.

June 8, 1926.

A. S. HOWELL 1,587,955

MOTION PICTURE PROJECTING MACHINE AND THE LIKE

Filed July 1, 1922   7 Sheets-Sheet 7

Inventor:
Albert S Howell

By Miehle+Miehle, Attys.

Patented June 8, 1926.

1,587,955

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

MOTION-PICTURE-PROJECTING MACHINE AND THE LIKE.

Application filed July 1, 1922. Serial No. 572,170.

The main features of my invention relate to the arrangement and construction of the parts and mechanism of a motion picture projecting machine with a view toward simplicity, compactness, efficiency, and adaptability for the purposes intended, and all with a view toward providing a machine which will operate efficiently with a minimum of care even in the hands of comparatively inexperienced persons.

Another feature relates to an arrangement whereby projecting members of the machine may be moved from their projecting positions into adjacent relation with the main structure for storage and transportation purposes.

Another feature relates to an air cooling system for preventing overheating of the lamp chamber and film and to the arrangement of the elements of the system with other parts of the machine with a view toward simplicity, compactness, and effectiveness.

With these features in view my invention consists in certain features of novelty in the construction, combination, and arrangement of parts by which the said features and certain other features hereinafter appearing are effected all as fully described with reference to the accompanying drawings and more particularly pointed out in the claims.

In the said drawings—

Figure 4 is a partial central horizontal section of the same.

Figure 5 is a partial section taken on the vertical rear surface of the air chamber casing, hereinafter described, and looking forwardly.

Figure 6 is a partial front view with the front cover of the gear casing, hereinafter described, removed.

Figure 7 is a fragmental section taken on a substantially vertical plane passing through the gear casing.

Figure 8 is a fragmental section taken on a horizontal plane and showing the light control switch, hereinafter described, in the gear casing.

Figure 12 is a central vertical transverse section of the lamp chamber, hereinafter referred to.

Like characters of reference indicate like parts in the various views.

Figure 1:
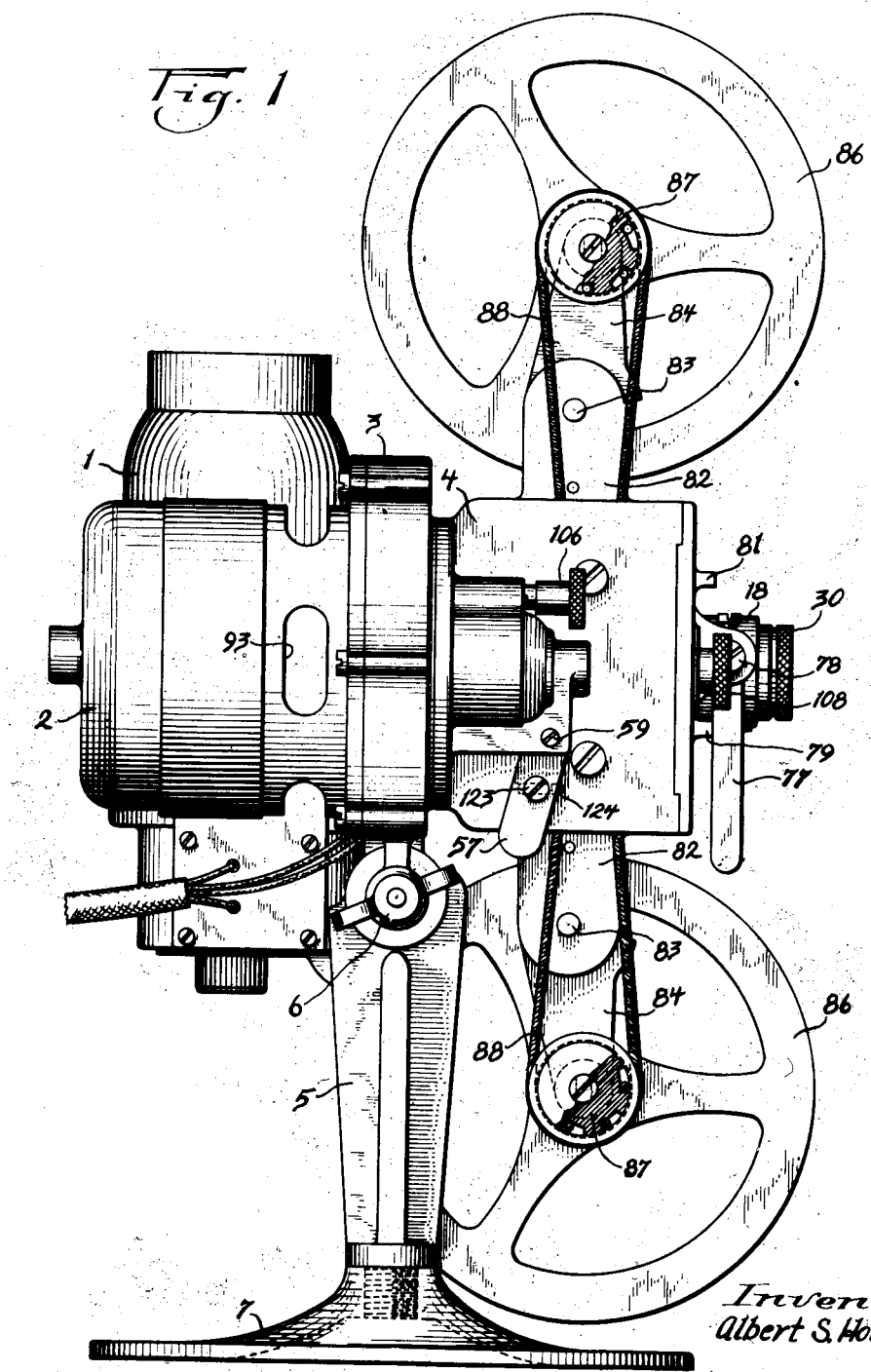
Figure 1 is a view in side elevation of a motion picture projecting machine embodying the features of my invention.
Figure 2:
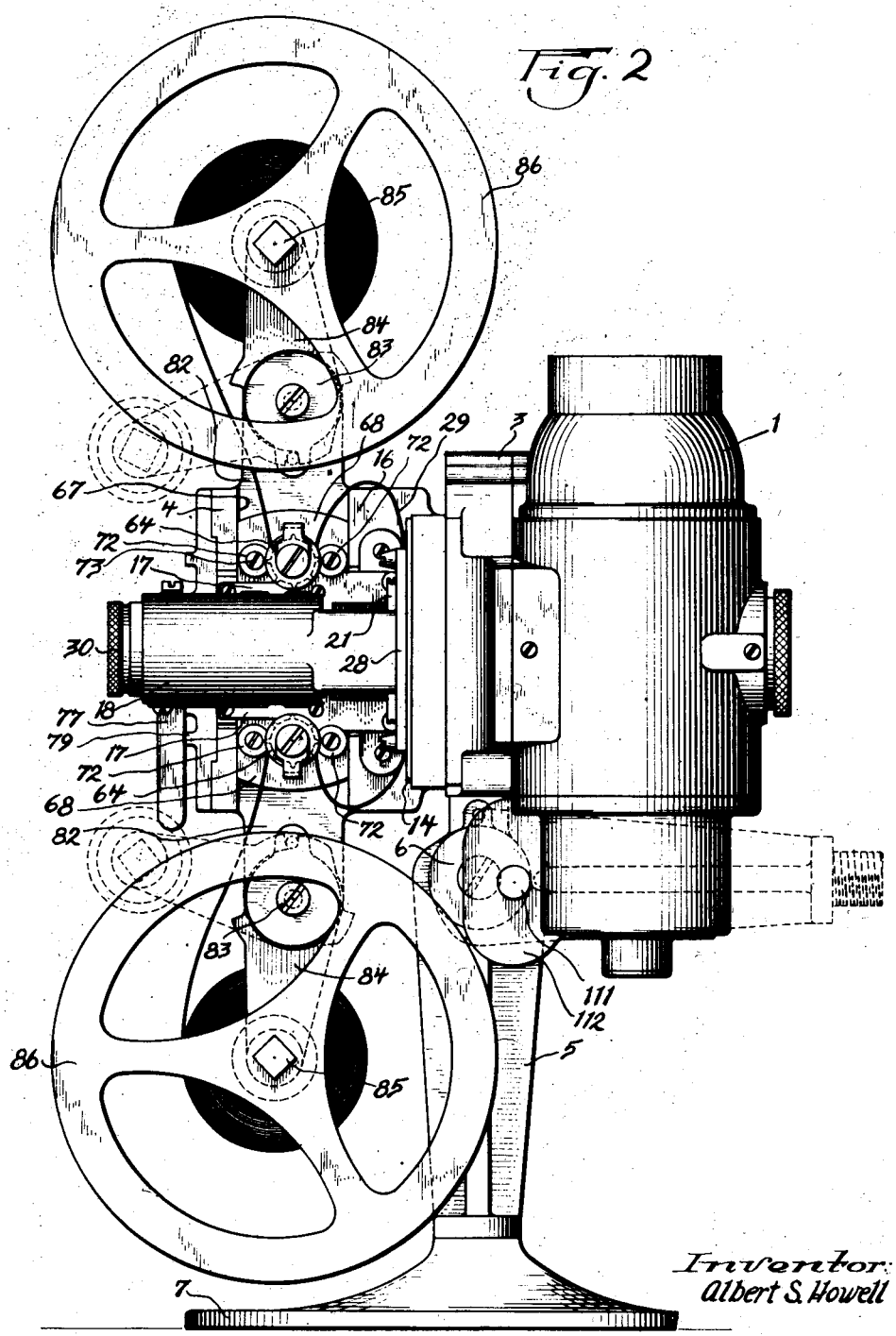
Figure 2 is a view in opposite side elevation of the same.
Figure 3:
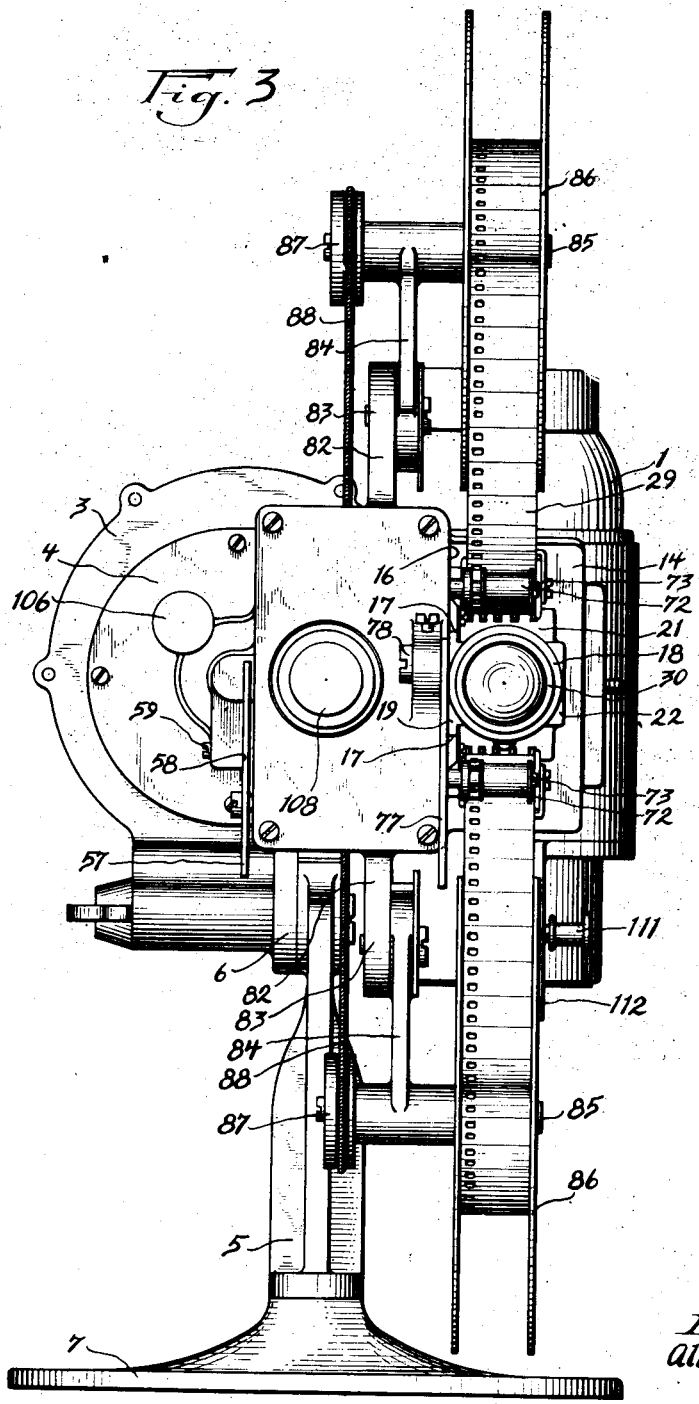
Figure 3 is a view in front elevation of the same.

In the said drawings 1 designates a lamp chamber, and disposed to one side of the lamp chamber and formed integrally therewith is an electric motor housing 2. The front of the lamp chamber and motor casing is faced in a transverse plane, and secured against this face and extending in front of the lamp chamber and motor casing is an air chamber casing 3. Secured to the front of the air chamber casing 3 is a gear casing 4. These three elements secured together as described comprise the main structure of the machine, and the machine is supported by a support arm 5 pivoted in central relation to the under side of the air chamber casing on a transverse horizontal axis by means of a friction hinge joint 6. A base plate 7 is screwthreaded upon the outer end of the arm 5 to form a sufficiently large base for the machine. The base plate may be detached from the arm and the arm may be swung from supporting position, as shown in Figs. 1 and 2, to a position adjacent the main structure of the machine, as shown by dotted lines in Fig. 2, to render the machine more compact for purposes of storage and transportation, and in addition to provide an adjustment for throwing the light projected from the machine to the desired vertical position.

Figure 10:
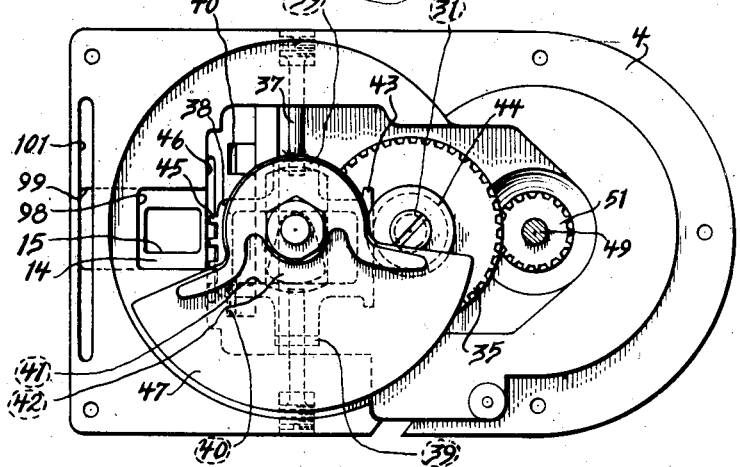
Figure 10 is a similar view showing the parts in different positions.
Figure 11:
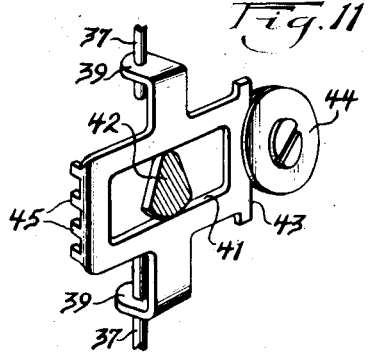
Figure 11 is schematic perspective view of the main portion of the intermittent film feeding mechanism, hereinafter described.

The lamp chamber 1 has a front light opening therein in which is mounted a condensing lens 8 disposed on an axis extending forwardly and rearwardly, and an incandescent electric lamp 9 having a concentrated filament is mounted in the lamp chamber in alinement with the condensing lens. See Fig. 4. The air chamber casing forms an air chamber 11 extending across the front of the lamp chamber and motor casing and enclosing the space in front of the condensing lens, and the light passes forward from the condensing lens across the air chamber and through an opening 12 in a transverse front partition wall 13 of the air chamber casing. The main portion of the gear casing 4 lies to the same side of the axis of the light as does the motor casing, and has a narrow transverse extension forming an enclosure in forward central relation with the chamber, and a rear film face guide plate 14 is mounted in an opening in the front wall of this extension in a plane normal to the condensing lens axis and extends vertically across the lens axis. This plate has a light aperture 15 alined with the condensing lens and through which the light passes. The main portion of the gear casing is separated from the above mentioned transverse extension by a vertical forwardly and rearwardly extending wall 16. Mounted for forward and rearward movement on opposing forwardly and rearwardly extending vertically spaced slides 17 on the outside of this wall is a lens mount member comprising a main tubular formation 18 alined with the lamp 9, condensing lens 8, and aperture 15, an integral forwardly and rearwardly extending rectangular formation 19 at the side thereof and disclosed in a vertical plane, the upper and lower edge portions of which are engaged in the slides 17, a transverse wall portion 21 spaced from the rear end of the tubular formation 18 and connected therewith by means of a rearward extending portion of the rectangular formation 19 and a connecting portion 22 between the transverse wall portion and the tubular formation disposed diametrically opposite with respect to the rectangular formation 19. The transverse wall portion 21 lies parallel with the plate 14, and has a light aperture 23 registering with the light aperture 15 of the plate 14. A pair of vertically extending parallel film guiding members 24 are mounted in suitable openings in the wall portion 21 on opposite sides of the light aperture 23. Springs 26 are secured to the front surface of the portion 21 and centrally engage the members 24 to urge them rearwardly, the members 24 being limited in their rearward movement in a manner unnecessary to be described. In addition the portion 21 is provided with film guiding rollers 27. A vertical film edge guide rail 28 is secured on the front surface of the plate 14 on the outside of the aperture 15. The outer sides of the slides 17 are formed by spring plates whose rear ends 40 extend rearwardly and are free for limited transverse movement. These ends are vertically spaced and are disposed above and below the aperture 15 on the inside thereof. See Figs. 4, 6 and 10. The plate 14, the edge guide rail 28, ends 40, and the transverse wall portion 21 with the parts assembled thereon as above set forth form an apertured film feed guide having its aperture alined with the condensing lens 8 and the light 9, and the transverse wall 21 with the parts assembled thereon forms a film face guide gate movable by reason of the slide mounting of the lens mount member on the slides 17 in a direction normal to the plane of a film in the guide into and out of film retaining position. A film 29 is shown in the guide in Fig. 4. The rear ends 40 extend across the plane of the film in the guide at the inner side edge thereof and individually engage the same to separately spring press the film edgewise with its outer edge engaged against the inner surface of the edge guide rail 28 whereby to exert tension upon the film and to guide it with its outer edge alined with the inner surface of the rail 28 throughout its length. A projecting lens 30 is mounted in the tubular formation 18 for longitudinal adjustment therein and is alined with the lamp 9, condensing lens, and the guide aperture.

Figure 9:
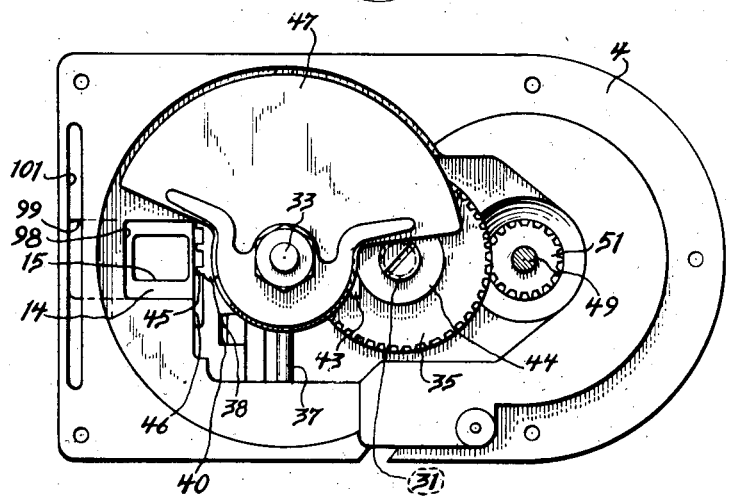
Figure 9 is a view in rear elevation of the gear casing and parts therein.

A shaft 31 in the gear casing is rotatably mounted on intermediate bearings 32 and is disposed on an axis normal to the plane of the film in the guide and to the side of the inner edge of the film. See Figs. 4, 9, and 10. A second shaft 33 in the gear casing is rotatably mounted on bearings 34 and is disposed on an axis normal to the plane of the film in the guide and to the side of the inner edge of the film. This shaft is accordingly parallel with the shaft 31, and is disposed between the shaft 31 and the film guide. A large spur gear 35 is secured on the shaft 31 adjacent its rear end, and a small spur gear 36 is formed on the shaft 33 adjacent its rear end and meshes with the large gear 35 whereby a plurality of revolutions of the shaft 33 is effected during one of the shaft 31, the ratio shown being 3 to 1.

Disposed in alined and spaced relation above and below the shaft 33 adjacent the rear end thereof on an axis disposed to the side of the inner edge of the film in the guide and parallel with the path of the film and intersected by the axis of the shaft 33 is a pair of studs 37 which are secured respectively in the upper and lower walls of the gear casing 4. A shuttle plate 38 is disposed in a vertical plane within the gear casing, and has reduced centrally disposed upper and lower end portions, the extreme ends 39 of which are turned laterally or forwardly out of the plane of the plate at right angles thereto. See Figs. 4, 9, 10, and 11. These ends are bored coaxially on an axis extending in parallelism and in central relation with the plate, and the studs 37 engage respective of these bores whereby the shuttle plate is mounted for pivotal movement on the stud axis and for movement therealong. The shuttle plate 38 is provided with a central aperture 41 elongated transversely of its pivotal axis and forming opposed surfaces extending transversely of the pivotal axis in intermediate relation with the studs. A radial cam 42 is formed on the shaft 33 to the rear of the gear 36 and is engaged in said aperture 41 and operates upon said opposed surfaces to effect reciprocating film feeding and return movement of the shuttle plate along the studs during rotation of the shaft 33. The shuttle plate has a vertically extending cam engaged portion 43 extending in parallelism with the pivotal axis thereof and disposed at the side of the pivotal axis thereof opposite that on which the film in the guide lies, and a drum cam 44 secured on the rear end of the shaft 31 engages the portion 43 and operates thereon to effect oscillating film engaging and disengaging movement of the shuttle plate on its pivotal axis. The shuttle plate extends in back of the inner vertical edge portion of the rear face guide plate 14 and has a number of vertically spaced forwardly extending film engaging teeth 45 formed thereon adapted to extend through a vertically elongated aperture 46 in the guide plate, disposed between the aperture 15 and the inner vertical edge of the plate, and engage usual perforations spaced longitudinally of the film 29 adjacent the inner edge thereof and alined with the aperture 46.

The cam 42 effects one reciprocating film feed and return movement of the shuttle plate along its pivotal axis with each revolution thereof, and the cam 44 effects one oscillating film engaging and disengaging movement of the shuttle plate on its pivotal axis with each revolution thereof and is adapted in its timed relation with the cam 42 to effect film engaging and disengaging movement of the shuttle plate in film feeding relation with but one of each plurality of feeding movements of the shuttle plate, and as shown the film is advanced during but one of each three revolutions of the cam 42. The effect of this arrangement is that the film advancing periods are extremely short and that the rest periods are correspondingly long.

The intermittent film feeding mechanism above described is a modification of the intermittent feeding mechanism described and claimed in my co-pending application, Serial No. 572,169 filed July 1, 1922 for improvement in intermittent feed mechanism, and illustrates the adaptability of said intermittent feeding mechanism to a motion picture projecting machine, the modification herein shown retaining the advantages of simplicity, ruggedness, adaptability for feeding motion picture film, and adaptability to operate on the film immediately adjacent the light aperture.

Secured on the extreme rear end of the shaft 33 is a balanced single blade revolving light shutter 47 which is adapted to sweep across the light aperture 15 at the rear of the plate 14 and in front of the condensing lens 8 to effect synchronous interruptions of the light. The blade of this shutter is considerably less than 180° and thereby effects preponderating light impulses, see Figs. 9 and 10, and is timed to interrupt the light during feeding movement of the film. In its rotation with the cam 42 the shutter interrupts the light at the same frequency as the advance movement frequency of the shuttle plate. Under normal operation the interruption frequency of the shutter is such that the synchronous light interruptions are imperceptible as such and the projected light appears to the eye as continuous and uninterrupted. Where as shown the shutter is connected to rotate at the same angular speed as the cam 42 a relatively small shutter may be used without causing a relatively long blend period, the speed at which the shutter rotates effecting a short blend period.

An electric motor 48 is disposed within the motor casing 2 with its shaft 49 extending forwardly through the air chamber 11 and into the enclosure of the gear casing 4 in parallelism with the shafts 31 and 33. See Fig. 4. A spur driving pinion 51 is rotatably mounted on the forward end of the motor shaft 49 and meshes with the gear 35 to drive the same. The drive pinion 51 has a concentric conical formation 52 on its rear end which is adapted to be frictionally engaged with a corresponding surface at the forward end of a cylindrical member 53 secured to the shaft 49 immediately to the rear of the drive pinion to form a friction clutch drive connection between the motor shaft and the drive pinion. A releasable spring clutch engaging device, generally indicated at 54, see Figs. 4 and 7, is mounted on the extreme front end of the shaft 49 immediately forward of the pinion 51 and normally urges the pinion rearwardly on the shaft to frictionally engage the conical formation 52 with the corresponding surface of the member 53 to engage the clutch so formed and fix the pinion with the shaft 49 to drive the gear 35 and the mechanism connected therewith. The clutch engaging device consists of a cylindrical member 131 secured on the shaft 49 immediately in front of the pinion 51, a pair of wedge members 132 engaged in respective or rearwardly facing diametrically opposite radial slots in the cylindrical member 131 and operating upon the forward surface of the pinion 51 to urge the same rearwardly with inward movement of the wedge members, and a circular coiled tension spring 133 engaged in an external circumferential groove in the cylindrical member 131 and passing over the outer ends of the wedge members and normally urging the same inwardly to drive the pinion 51 from the shaft 49. A stud member 55 is mounted for longitudinal movement in a concentric bore 56 in the forward end of the shaft 49, and is provided with a diametrical slot at the inner portion thereof in which is mounted a roller 134. The inner ends of the wedge members 132 extend through diametrically opposite slots in the shaft 49 and into the slot of the stud member 55, and by reason of the formation of the inner ends thereof are engaged by the roller 134 and moved outwardly and locked in an outward position to release the clutch when the stud member 55 is moved to the inner or rearward end of its movement, a concentric cylindrical circumferentially grooved head at the forward end of the stud member serving to limit the rearward movement of the stud member by engagement with the front end of the shaft 49. Thus rearward movement of the stud member releases the clutch to disconnect the motor from the drive pinion and forward movement of the stud member permits the engaging device 54 to engage the clutch. Longitudinal movement of the stud member 55 is controlled by a lever 57 engaging the groove of the stud 55 and extending through a slot 58 in the motor casing to the outside of the gear casing for manual manipulation and pivoted at an intermediate point on a stud 59 extending across the slot. See Figs. 1, 3, 4, and 7.

A gear wheel 61 within the gear casing is secured on the shaft 31 adjacent its forward end and has screw gear teeth cut in both directions thereon and crossing each other as designated at 62. See Figs. 4 and 6. A pair of vertically spaced right and left hand screw gears 63 within the casing are disposed on opposite sides of the gear wheel 61 on horizontal axes normal to the axis of said gear wheel and to the path of the film in the guide, and these gears mesh with respective teeth of the gear wheel. By this arrangement both of the gears 63 rotate in the same direction though they are on opposite sides of the shaft 31. A pair of rotatably mounted film sprockets 64 are disposed outside of the gear casing and are disposed in film feeding alinement with the film guide for feeding the film to and from the ends of the guide. These sprockets are disposed coaxial with respective gears 63 and have extensions 65 extending through suitable openings in the wall 16 and rotatably secured with respective gears 63 by means of the toothed clutches 66 to be driven thereby. The right hand spiral gear 63 is disposed above the shaft 31 and the left hand gear 63 is disposed below the shaft so that when the shaft 31 rotates in a counter-clockwise direction in Fig. 6 the sprockets are rotated in a counter-clockwise direction in Fig. 2. Thus is provided a very simple and direct sprocket driving mechanism, and it will be noted that the entire film feeding mechanism comprises relatively few parts compactly arranged and well adapted for their purposes.

The outer surface of the wall 16 of the gear casing is provided with a vertically extending relatively wide groove 67 disposed centrally with respect the film sprockets 64. See Figs. 2 and 4. Mounted for independent sliding movement in this groove normal to the axes of the sprockets and disposed normal to said axes is a pair of support plates 68 overlapped between the sprockets. The overlapped portions of the plates 68 lie under the rectangular formation 19 of the lens mount member above described and are provided with overlying opposite cam slots 69 which are engaged by a stud 71 secured on the rectangular formation 19 of the lens mount member and projecting inwardly from the inner surface thereof, whereby the plates 68 are moved vertically with horizontal movement of the lens mount member and the film gate thereon along the slides 17 into and out of film retaining position. Two film retaining rollers 72 are rotatably mounted on each plate 68 by means of screw studs 73 and are so disposed with respect to respective sprockets 64 that downward movement of the upper plate effects movement of the rollers carried thereby into film retaining relation with the upper film sprocket, and upward movement of the lower plate effects movement of the rollers carried thereby into film retaining relation with the lower sprocket. The opposite movement of each plate effects movement of the rollers carried thereby out of film engaging relation with the respective sprocket. The cam slots 69 are so formed that with rearward movement of the lens mount member to move the film gate into film retaining position effects movement of the plates to move the rollers 72 carried thereby into film retaining relation with respective sprockets, and opposite movement of the lens mount member effects opposite movement of the plates. Thus is provided a simple and effective mechanism for simultaneously operating all of the film retaining devices into and out of film retaining position which is particularly adapted to motion picture machines where two spaced film sprockets are utilized in the feeding of the film to and from the film guide. The inner surface of the rectangular formation 19 of the lens mount member has a vertical groove 74 adjacent its front end, and engaging this slot is a slide block 75 which is mounted on a crank pin 76 on a hand lever 77 pivotally mounted on an eccentric stud 78 disposed on an axis normal to the plane of the inner surface of the formation 19, which stud is secured on a boss at the front end of the gear casing. When the lens mount member is positioned rearwardly with the gate in film retaining position the crank pin is on one center with the stud 78, and the lens mount member with the gate is locked in this position, and the plates 68 are accordingly locked with the rollers 72 in film retaining position. A stop 79 on the gear casing prevents movement of the lever 77 past this center, and a second stop 81 on the gear casing prevents movement of the lever 77 past the opposite center.

Short vertical extensions 82 are formed on the upper and lower walls of the gear casing 4, and pivotally mounted on the ends of these arms by means of friction hinge joints 83 disposed on axes parallel to film sprockets 64 are arms 84. See Figs. 1, 2, and 3. By means of the hinge joints 83 the arms are adapted to be moved from projecting or operative positions to positions adjacent the main structure to render the machine more compact for purposes of storage and transportation. The positions of the arms 84 when disposed adjacent the main structure are indicated by dotted lines in Fig. 2. Film reel shafts 85 are rotatably mounted in parallelism with the sprockets 64 on the free ends of respective arms 84. Film reels 86 are detachably secured on respective shafts 85 in film feeding alinement with the sprockets. One way driving devices 87 of usual construction are mounted on respective shafts 85 and are provided with belt grooves which are engaged by respective driving belts 88 which extend through respective openings in the gear casing and engage grooves on the hubs of respective gears 63 to drive therefrom. In the normal operation of the machine the film 29 is fed from the upper film reel under the upper sprocket 64, downwardly through the film guide, over the lower sprocket 64, and finally wound upon the lower film reel, the drive device 87 of the lower reel shaft 85 rotating the same to wind the film on this reel, and the driving device on the upper reel shaft permitting the upper reel to rotate as the film is unwound therefrom by the upper film sprocket. See Figs. 2 and 3.

A centrifugal air impeller is disposed within the air chamber 11 and comprises a web 91 secured at the rear end of the cylindrical member 53, which is secured to the motor shaft 49, and impeller blades 92 formed therefrom. See Figs. 4 and 5. The normal direction of operation of the motor shaft 49 is counter-clockwise in Fig. 5, and the blades 92 throw the air outwardly during rotation of the shaft, the air being drawn through openings 93 in the motor casing and through the openings of a spider formation 94 which supports a bearing 95 of the shaft 49 at the front end of the motor. The air chamber casing around the impeller is formed eccentrically therewith to direct air thrown from the impeller blades into the portion of the air chamber between the lamp chamber and film guide. The air chamber communicates with the lamp chamber through an opening 96 in the lamp chamber casing, and the air passes from the lamp chamber through an opening 97 at the top of the chamber. Thus an air current is maintained through the lamp chamber to prevent overheating from the heat thrown off by the lamp. It will be noted that the air impeller is permanently connected with the motor shaft so that the air current is maintained during rotation of the motor though the film operating mechanism is stopped by release of the clutch connecting the drive pinion 51 with the motor shaft as above set forth.

The air chamber 11 communicates with the aperture of the film guide through the opening 12, above referred to. See Figs. 4 and 5. A deflecting blade 97, formed integrally with the wall 3, extends vertically across the opening 12 and is adapted to deflect a portion of the air current toward the aperture of the guide to prevent overheating of the film thereat. An air confining structure 98, formed with the gear casing extension above described, partially confines the space immediately to the rear of the light aperture 15 and extends around the upper, outer, and lower sides of the light aperture, and an air passage 99 leads outwardly from the outer side of the light aperture to conduct the air therefrom. See Figs. 4, 5, 9, and 10. The purpose of this arrangement is to cooperate with the deflecting blade 97 to maintain a current of air across the film at the light aperture. The passage 99 leads to a vertical slot 101 formed adjacent the outer vertical edge of the gear casing extension, above mentioned, which slot is open at the rear surface of the gear casing structure. The air chamber casing 3 covers this slot and has two vertically spaced openings 102 disposed outwardly of the opening 12 and disposed respectively above and below this opening, which openings communicate with the upper and lower ends of the slot 101 and provide a passage for the air from the slot into the air chamber. The lamp chamber casing has two vertical spaced openings 103 therein alined with the openings 102 and communicating the lamp chamber with the air chamber on the outside of the condensing lens 8. A crescent shaped formation 104 extends across the air chamber and extends around the condensing lens and has its open portion facing the impeller. This formation baffles the main current of air and permits the passage of the air from the openings 102 across the air chamber and through the openings 103 into the lamp chamber.

The web 91 of the air impeller lies adjacent the transverse partition wall 13 and disposed in a segmental opening in this wall is a segmental friction plate 105 which is adapted to be frictionally engaged with the front surface of the web 91. See Figs. 5 and 7. A cylindrical member 106 is screw-threaded into a bore of the gear casing 4 in front of the friction plate 105 on an axis normal thereto and has its front end enlarged and disposed exteriorly of the gear casing for manual manipulation. A spring pressure mechanism 107 is mounted in a concentric rearwardly facing bore of the member 106 and exerts rearward pressure on the plate 105 to frictionally engage the web 91 whereby to control the speed of the motor and consequently the speed of operation of the mechanism. Angular adjustment of the cylindrical member 106 varies the pressure upon the plate so that the speed of the motor and mechanism may be varied.

The shaft 31 extends through an opening in the front end of the gear casing 4 and a manipulating knob 108 is secured thereon exteriorly of the gear casing so that the mechanism may be turned by hand for various purposes such as lacing the film.

Figure 12:
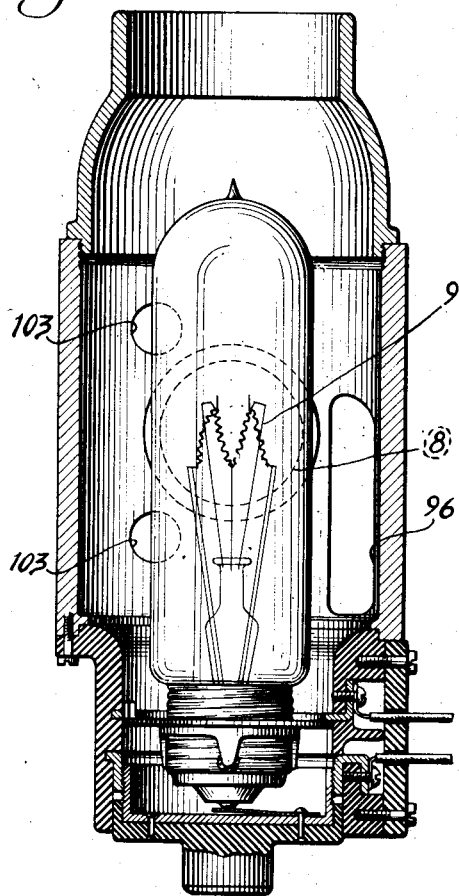
Figure 13:
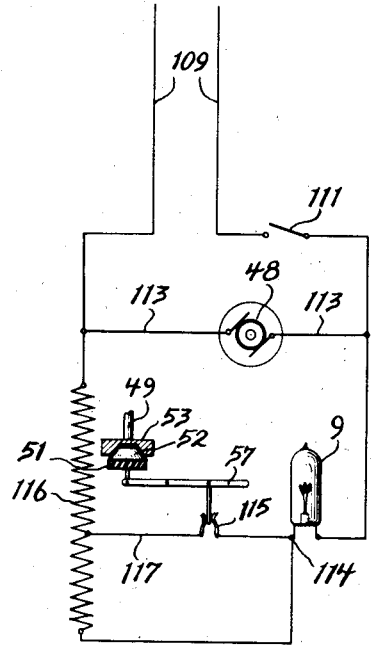
Figure 13 is a diagram of the electric circuit arrangement of the machine.

The incandescent electric lamp 9 is mounted at the lower end of the lamp chamber in a manner clearly illustrated in Fig. 12. The electric motor and lamp are supplied with current through main circuit wires 109, and the main circuit is controlled by a switch 111. See Fig. 13. This switch is of usual construction and is mounted in a block 112 of insulating material secured to the motor casing 2. See Figs. 2 and 3. The motor is shunted across the main circuit wires 109 in controlled relation with the switch 111 by wires 113. See Fig. 13. The lamp 9 is also shunted across the wires 109 in controlled relation with the switch 111 in the following manner. One terminal of the lamp is connected to one of the wires 109. The other terminal of the lamp is connected to a branched wire 114, one of the branches of which is connected to one terminal of a switch 115, and the other branch of which is connected to one end terminal of a resistance 116. The other end terminal of the resistance is connected to the wire 109 to which the lamp is not directly connected. A wire 117 is connected with the other terminal of the switch 115 and is connected with the resistance 116 at an intermediate point. The portion of the resistance between the wire 117 and the wire 109 connected therewith reduces the voltage on the lamp so that a lamp of lower voltage than the motor may be used. The portion of the resistance between the wire 117 and the end of the resistance connected with a branch of the wire 114 forms a high resistance circuit to the lamp. Thus it will be noted that a low resistance circuit in series with the lamp is provided and includes the switch 115, and that a high resistance circuit in shunt with this switch and in series with the lamp is provided and includes the portion of the resistance 116 between the wire 117 and the end of the resistance connected with a branch of the wire 114. Thus when the switch 115 is closed the lamp is supplied with normal current through the low resistance circuit to effect the maximum intensity of light, and when this switch is opened the current through the lamp is reduced by reason of it passing through the high resistance circuit whereby the intensity of the light is diminished with a corresponding diminution of the heat thrown off by the lamp. The switch 115 is of a conventional type and comprises two opposed spring contact pieces 118, mounted on a block 119 of insulating material within the gear casing 4, and a contact rod 121 longitudinally movable into and out of contacting position between the contact pieces 118. See Figs. 7 and 8. The outer end of the rod 121 is enlarged and is mounted for longitudinal movement in a bore 122 in the gear casing. A stud 123 is mounted on the lever 57 and extends through a slot 124 in the gear casing extending longitudinally of the bore 122 and engages a circumferential groove 125 on the enlarged portion of the rod 121 within said bore. As hereinbefore stated the lever 57 controls the driving clutch, and by means of the above described connection between the switch 115 and the lever, the clutch and switch are controlled together. The arrangement is such that when the lever 57 is moved to release the clutch the switch 115 is opened and the light is diminished thereby diminishing the heat thrown off by the lamp and decreasing the amount of heat to which the film is subject at the light aperture. The reduced light from the lamp is sufficient to aid the operator in placing the film in and removing the same from the film guide. Movement of the lever 57 to engage the clutch closes the switch 115 and the light is accordingly increased with operation of the film feeding mechanism to feed the film.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following claims:—

1. A motion picture projecting machine including a lamp chamber, an apertured intermittent feed film guide in front of the lamp chamber wherein a film is subject to the light, a pair of parallel shafts disposed to the side of one edge of a film in the guide on axes normal to the plane of the film, a large spur gear on one of the shafts, a small spur gear on the other shaft and meshing with the large spur gear to effect a plurality of revolutions of this shaft during one of the other shaft, an electric motor disposed to one side of the lamp chamber with its shaft in parallelism with said shafts, a drive pinion on the motor shaft meshing with the large spur gear for driving the same from the motor, a shuttle for feeding a film in said guide, a cam on the plural revolution shaft for effecting feeding and return movement of the shuttle, a cam on the single revolution shaft adapted to effect film engaging and disengaging movement of the shuttle in film feeding relation with but one of each plurality of feeding movements of the shuttle, a single blade revolving light shutter on the plural revolution shaft adapted to sweep over the aperture of the guide, film sprockets for feeding the film to and from the guide, and right angle spiral gearing for driving the sprockets from one of said parallel shafts.

2. A motion picture projecting machine including a lamp chamber, an apertured film feed guide in front of the lamp chamber wherein a film is subjected to the light, an electric motor disposed alongside the lamp chamber with its shaft normal to the plane of a film in the guide and extending forwardly, an air chamber between the lamp chamber and guide and communicating with the lamp chamber and aperture of the guide and extending around the motor shaft, an air impeller wheel in the air chamber and secured to the motor shaft for maintaining a current of air through the lamp chamber and on the film at the aperture of the guide, film operating mechanism and a light shutter disposed in front of the air chamber, and a driving pinion on the motor shaft in front of the impeller wheel for driving the film feeding mechanism and shutter from the motor.

3. A motion picture projecting machine including a lamp chamber, an apertured film feed guide in front of the lamp chamber wherein a film is subjected to the light, an electric motor disposed alongside the lamp chamber with its shaft normal to the plane of a film in the guide and extending forwardly, an air chamber between the lamp chamber and guide and communicating with the lamp chamber and aperture of the guide and extending around the motor shaft, an air impeller wheel in the air chamber and secured to the motor shaft for maintaining a current of air through the lamp chamber and upon the film at the aperture of the guide, film operating mechanism and a light shutter disposed in front of the air chamber, and means for driving the film operating mechanism and shutter from the motor shaft including a driving pinion on the motor shaft in front of the impeller wheel and a releasable clutch for driving the pinion from the motor shaft.

4. A motion picture projecting machine including an apertured film guide, a gear wheel disposed on an axis disposed to the side of one edge of a film in the guide and normal to the film plane and having screw gear teeth cut in both directions thereon and crossing each other, a pair of right and left hand screw gears disposed on opposite sides of the gear wheel on axes normal to the axis thereof and to the film path and meshing with respective teeth of the gear wheel film sprockets fixed with respective screw gears for feeding film to and from the guide, an intermittent film feeding mechanism operatively connected with said gear wheel for intermittently feeding the film in said guide, and a light shutter operatively connected with said gear wheel.

5. A motion picture projecting machine including an apertured film guide, a gear wheel disposed on an axis disposed to the side of one edge of a film in the guide and normal to the film plane and having screw gear teeth cut in both directions thereon and crossing each other, a pair of right and left hand screw gears disposed on opposite sides of the gear wheel on axes normal to the axis thereof and to the film path and meshing with respective teeth of the gear wheel, film sprockets fixed with respective screw gears for feeding the film to and from the guide, an intermittent film feeding mechanism operatively connected with said gear wheel for intermittently feeding the film in said guide, a shutter operatively connected with said gear wheel, film reel shafts cooperatively disposed with respective film sprockets, and belt and pulley driving connections between respective screw gears and film reel shafts.

6. A motion picture projecting machine including an apertured film guide, a pair of parallel shafts disposed to one side of an edge of a film in said guide and normal to the film plane, a large spur gear on one shaft, a small spur gear on the other shaft meshing with the large gear to effect a plurality of revolutions of this shaft during one of the other shaft, a shuttle for feeding the film in said guide, a member on the plural revolution shaft for effecting film feeding and return movement of the shuttle, a cam on the single revolution shaft for effecting engagement and disengagement of the shuttle with the film in said guide in feeding relation with but one feeding movement of the shuttle during each revolution of the single revolution shaft, a single blade revolving light shutter on the plural revolution shaft adapted to sweep over the aperture of the guide, a gear wheel on the single revolution shaft having screw gear teeth cut in both directions thereon and crossing each other a pair of right and left hand screw gears disposed on opposite sides of said gear wheel on axes normal to the axis thereof and to the film path and meshing with respective teeth of the screw gear wheel, and film sprockets fixed with respective screw gears for feeding the film to and from the guide.

7. A motion projecting machine including an apertured intermittent feed film guide, a large spur gear disposed to the side of one edge of a film in the guide on an axis normal to the plane of the film, an electric motor disposed with its shaft in parallelism with the gear axis, a driving pinion on the motor shaft and meshing with the large gear, intermittent film feeding mechanism operatively connected with the large gear for intermittently feeding a film in said guide, a shutter operatively connected with the large gear for interrupting the light, two constant feed film sprockets for feeding the film to and from the guide, and right angle gearing for driving the sprockets from the large gear.

8. A motion picture projecting machine including an apertured intermittent feed film guide, a large spur gear disposed to the side of one edge of a film in the guide on an axis normal to the film, an electric motor disposed with its shaft in parallelism with the gear axis, a driving pinion on the motor shaft and meshing with the large gear, intermittent film feeding mechanism operatively connected with the large gear for intermittently feeding a film in said guide, a shutter operatively connected with the large gear for interrupting the light, constant feed film sprockets for feeding the film to and from the guide, a gear wheel fixed with the large gear and having screw gear teeth cut in both directions thereon and crossing each other, and a pair of right and left hand screw gears disposed on opposite sides of said gear wheel on axes normal thereto and meshing with respective teeth of said gear wheel for driving respective sprockets.

9. A motion picture projecting machine including an apertured intermittent feed film guide, a large spur gear disposed to the side of one edge of a film in the guide on an axis normal to the plane of the film, an electric motor disposed with its shaft in parallelism with the gear axis, a driving pinion on the motor shaft and meshing with the large gear for driving the same, intermittent film feeding mechanism operatively connected with the large gear for intermittently feeding a film in the guide, a shutter operatively connected with the large gear for interrupting the light, a gear wheel fixed with the large gear and having screw teeth cut in both directions thereon and crossing each other, a pair of right and left hand screw gears disposed on opposite sides of said gear wheel on an axis normal to the axis thereof and to the film path and meshing with respective teeth of said gear wheel, and film sprockets fixed with respective screw gears for feeding the film to and from the guide.

10. A motion picture projecting machine including an apertured film guide, a pair of parallel shafts disposed to one side of an edge of a film in said guide and normal to the film plane, a large spur gear on one shaft, a small spur gear on the other shaft meshing with the large gear to effect a plurality of revolutions of this shaft during one of the other shaft, a shuttle for feeding the film in said guide, a cam on the plural revolution shaft for effecting film feeding and return movement of the shuttle, a cam on the single revolution shaft for effecting engagement and disengagement of the shuttle with the film in film feeding relation with but one of each plurality of feeding movements of the shuttle, a revolving light shutter on one of said shafts adapted to sweep over the aperture of the guide, a gear wheel on the single revolution shaft having screw teeth cut in both directions thereon and crossing each other, a pair of right and left hand screw gears disposed on opposite sides of said gear wheel on axes normal to the axis thereof and to the film path and meshing with respective teeth of said gear wheel, film sprockets fixed with respective screw gears for feeding the film to and from the guide, a motor disposed with its shaft in parallelism with said shafts, and a spur driving pinion on the motor shaft and meshing with said large spur gear to drive the same.

11. A motion picture projecting machine including an apertured film guide, a pair of parallel shafts disposed to one side of an edge of a film in said guide and normal to the film plane, a large spur gear on one shaft, a small spur on the other shaft and meshing with the large spur gear to effect a plurality of revolutions of this shaft during one of the other shaft, a shuttle for feeding the film in said guide, a member on the plural revolution shaft for effecting feeding and return movement of the shuttle, a cam on the single revolution shaft for effecting engagement and disengagement of the shuttle with the film in feeding relation with but one of each plurality of feeding movements of the shuttle, a single blade revolving light shutter on the plural revolution shaft adapted to sweep over the aperture of the guide, constant feed film sprockets for feeding the film to and from the guide, right angle gearing for driving the sprockets from the single revolution shaft, an electric motor disposed with its shaft in parallelism with said shafts, and a driving pinion on the motor shaft and meshing with said large gear.

12. A motion picture projecting machine including a main structure, a pair of arms pivotally mounted on the main structure for movement from projecting positions to positions adjacent the main structure, film reel shafts mounted on respective arms, means for driving said shafts from the main structure when the arms are in projecting positions, and a support arm pivotally mounted on the main structure for movement from a supporting position projecting from the main structure to a position adjacent thereto.

13. A motion picture projecting machine including a main structure, a pair of arms pivotally mounted on the main structure for movement from projecting positions to positions adjacent the main structure, film reel shafts mounted on respective arms, belt and pulley mechanism for driving said shafts from the main structure when the arms are in projecting positions, a support arm pivotally mounted on the main structure on a transverse horizontal axis for movement from supporting position projecting from the main structure to a position adjacent thereto, and a supporting base on the support arm.

14. A motion picture machine including a lamp chamber, a source of light in said lamp chamber, a film feeding mechanism, a light shutter, a motor, a releasable clutch for effecting operation of the feeding mechanism and shutter by the motor, and an air blower permanently connected with the motor to be operated thereby for maintaining a current of air through the lamp chamber.

15. A motion picture machine including a lamp chamber, an apertured film feed guide wherein the film is subjected to the light, an air chamber between the lamp chamber and film guide and communicating with the lamp chamber and aperture of the guide and extending laterally from the lamp chamber and guide, and an air impeller wheel in the laterally extending portion of the air chamber for maintaining a current of air through the lamp chamber and upon the film at the aperture of the guide.

16. A motion picture machine including a lamp chamber, an apertured film feed guide wherein the film is subjected to the light, an electric motor at the side of the lamp chamber and having its shaft disposed normal to the plane of the film in said guide, an air chamber between the lamp chamber and film guide and communicating with the lamp chamber and aperture of the guide and extending around the motor shaft, and an air impeller wheel in the air chamber and secured on the motor shaft for maintaining a current of air through the lamp chamber and upon the film at the aperture of the guide.

17. A motion picture machine including a lamp chamber, an apertured film guide wherein the film is subjected to the light, an air chamber between the lamp chamber and guide and communicating with the lamp chamber and aperture of the guide, means for forcing a current of air in the air chamber, a deflecting blade in the air chamber to one side of the aperture for deflecting a portion of the air current toward the aperture, and an air passage having an inlet at the opposite side of the aperture for conducting the air from the aperture.

18. A motion picture machine including a lamp chamber, an apertured film guide wherein the film is subjected to the light, an air chamber between the lamp chamber and guide and communicating with the lamp chamber and guide, means for forcing a current of air into the air chamber, and an air passage having an inlet adjacent the aperture for conducting air therefrom and communicating with the lamp chamber.

19. A motion picture machine including a lamp chamber, an apertured film guide wherein the film is subjected to the light, an air chamber between the lamp chamber and the aperture of the guide and communicating with the lamp chamber and guide, means for forcing a current of air into the air chamber, a deflecting blade in the air chamber to one side of the aperture for deflecting a portion of the air current toward the aperture, and an air passage having an inlet adjacent the opposite side of the aperture for conducting the air from the aperture and communicating with the lamp chamber.

In witness whereof I have hereunto affixed my signature this twenty-eighth day of June 1922.

ALBERT S. HOWELL.